Patented May 13, 1941

2,241,449

UNITED STATES PATENT OFFICE 2,241,449

COLORATION OF TEXTILE AND OTHER MATERIALS

George Holland Ellis and Henry Charles Olpin, Spondon, near Derby, England, assignors to Celanese Corporation of America, a corporation of Delaware No Drawing. Application August 19, 1939, Serial No. 291,004. In Great Britain October 27, 1936

2 Claims. (Cl. 260—205)

This invention relates to the manufacture of new azo dyes which are of great value for the coloring of cellulose acetate and other cellulose ester and ether materials. This application is a continuation in part of our application S. No. 166,574, filed September 30, 1937, now abandoned.

The new azo dyes of the present invention can be obtained by coupling a diazotized 4-nitro-2:6-dihalogen aniline with N-di-(β-hydroxyethyl)-aniline. They are of the formula

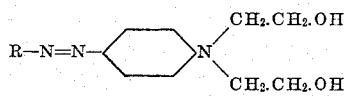

wherein R is a 4-nitro-2:6-dihalogen-phenyl group. The new dyes have very good affinity for cellulose acetate and other cellulose ester or ether materials which they dye in valuable brownish shades which are of very good fastness to light, washing, acids and alkalies and can be discharged to white with zinc formaldehyde sulphoxylate. The appearance of the dyeings is difficult to describe. Perhaps they are best described as very bright brown shades considerably inclined towards orange or yellow.

The 4-nitro-2:6-dihalogen-aniline employed may be, for instance, 4-nitro-2:6-dichlor-aniline, 4-nitro-2:6-dibrom-aniline, or 4-nitro-2-chlor-6-brom-aniline.

Methods other than that mentioned above may also be used for preparing the new dyes. For example, two hydroxyethyl groups may be introduced into the amino group of a 4-nitro-2:6-dihalogenbenzene-azo-4'-amino benzene of the formula

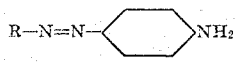

where R is a 4-nitro-2:6-dihalogen-phenyl group. Such introduction of hydroxyethyl groups can be effected by means of ethylene chlorhydrin or ethylene oxide.

The new dyes can be applied to cellulose ester or ether materials in the form of aqueous dispersions prepared, for example, with the aid of dispersing agents, e. g. Turkey red oil, the sulphuric acid esters of oleyl and other higher fatty acid alcohols, alkyl substituted naphthalene sulphonic acids, and other agents referred to in U. S. Patents Nos. 1,618,413, 1,618,414, 1,694,413, 1,690,481, 1,803,008, 1,840,572 and 1,716,721. They may be applied from dye baths or by other methods, e. g. by printing or padding methods.

The invention includes the manufacture of the new dyes, the dyes themselves, compositions comprising the dyes and dispersing agents, processes of coloring cellulose ester or ether materials with the dyes, and cellulose ester and ether materials colored with the dyes.

The invention is illustrated by the following examples, the "parts" referred to being parts by weight.

Example 1

A solution of nitrosyl sulphuric acid is prepared by adding 3.6 parts of sodium nitrite to 55 parts of concentrated sulphuric acid. After cooling to 35° C. 12.6 parts of 4-nitro-2-chlor-6-brom-aniline are added and the mixture stirred for 2 hours at the same temperature and then poured on to ice and water. The diazo solution so obtained is run into an ice cold solution of 9.1 parts of N-di-(β-hydroxyethyl)-aniline in 400 parts of water and 8.5 parts of hydrochloric acid 32° Tw. The product is filtered off, neutralised, and retained as an aqueous paste. It dyes cellulose acetate in brown shades as hereinbefore described.

Similar dyes are obtained by substituting equivalent amounts of 4-nitro-2:6-dichlor-aniline and 4-nitro-2:6-dibrom-aniline for the 12.6 parts of 4-nitro-2-chlor-6-brom-aniline specified above.

Example 2

10 parts of a 10% aqueous paste of the dye from 4-nitro-2-chlor-6-brom-aniline and N-di-(β-hydroxyethyl)-aniline, made as described in Example 1, are warmed with 3 parts of Turkey red oil. The whole is diluted with 1000 parts of boiling 0.025% soap solution and then further diluted with 2000 parts of warm 0.025% soap solution. 100 parts of previously scoured cellulose acetate knit fabric are introduced at 45° C. and the temperature raised gradually to 78/80° C. during ½ hour. The goods are worked at this temperature for a further hour, when the fabric is removed, rinsed and dried. A bright brown shade, considerably inclined towards orange or yellow, is obtained.

Having described our invention, what we desire to secure by Letters Patent is:

1. 4-nitro-2-chlor-6-brom-benzene-azo-N- di - (β-hydroxy-ethyl) -aniline.

2. Cellulose actate materials colored with the dye claimed in claim 1.

GEORGE HOLLAND ELLIS.
HENRY CHARLES OLPIN.